United States Patent
Kowalski et al.

(10) Patent No.: US 11,551,405 B2
(45) Date of Patent: Jan. 10, 2023

(54) COMPUTING IMAGES OF DYNAMIC SCENES

(71) Applicant: Microsoft Technology Licensing, LLC, Redmond, WA (US)

(72) Inventors: Marek Adam Kowalski, Cambridge (GB); Matthew Alastair Johnson, Cambridge (GB); Jamie Daniel Joseph Shotton, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 147 days.

(21) Appl. No.: 16/927,928

(22) Filed: Jul. 13, 2020

(65) Prior Publication Data
US 2021/0390761 A1 Dec. 16, 2021

(30) Foreign Application Priority Data
Jun. 15, 2020 (GB) .................................. 2009058.5

(51) Int. Cl.
| | |
|---|---|
| G06T 15/06 | (2011.01) |
| G06T 7/80 | (2017.01) |
| G06N 20/00 | (2019.01) |
| G06N 3/08 | (2006.01) |
| G06T 15/08 | (2011.01) |
| G06T 7/73 | (2017.01) |
| A63F 13/52 | (2014.01) |
| G06T 17/10 | (2006.01) |

(52) U.S. Cl.
CPC .............. *G06T 15/06* (2013.01); *A63F 13/52* (2014.09); *G06N 3/08* (2013.01); *G06N 20/00* (2019.01); *G06T 7/75* (2017.01); *G06T 7/80* (2017.01); *G06T 15/08* (2013.01); *G06T 17/10* (2013.01); *G06T 2207/20081* (2013.01)

(58) Field of Classification Search
None
See application file for complete search history.

(56) References Cited

PUBLICATIONS

Mildenhall., et al. "NeRF: Representing Scenes as Neural Radiance Fields for View Synthesis", In repository of arXiv, arXiv:2003.08934, Mar. 19, 2020, pp. 1-21.
Pumarola, et al., "D-NeRF: Neural Radiance Fields for Dynamic Scenes", In Repository of arXiv:2011.13961v1, Nov. 27, 2020, 10 Pages.
Sitzmann, et al., "Scene Representation Networks: Continuous 3D-Structure-Aware Neural Scene Representations", In Repository of arXiv:1906.01618v2, Jan. 28, 2020, 23 Pages.
"International Search Report and Written Opinion Issued in PCT Application No. PCT/US21/032132", dated Aug. 12, 2021, 16 Pages.

*Primary Examiner* — Kyle Zhai

(57) ABSTRACT

Computing an output image of a dynamic scene. A value of E is selected which is a parameter describing desired dynamic content of the scene in the output image. Using selected intrinsic camera parameters and a selected viewpoint, for individual pixels of the output image to be generated, the method computes a ray that goes from a virtual camera through the pixel into the dynamic scene. For individual ones of the rays, sample at least one point along the ray. For individual ones of the sampled points, a viewing direction being a direction of the corresponding ray, and E, query a machine learning model to produce colour and opacity values at the sampled point with the dynamic content of the scene as specified by E. For individual ones of the rays, apply a volume rendering method to the colour and opacity values computed along that ray, to produce a pixel value of the output image.

20 Claims, 7 Drawing Sheets

COMPUTING IMAGES OF DYNAMIC SCENES

CROSS-REFERENCE TO RELATED APPLICATION

This application claims the benefit of UK patent application number 2009058.5 filed on 15 Jun. 2020, entitled "Computing images of dynamic scenes" the entirety of which is hereby incorporated by reference herein.

BACKGROUND

A dynamic scene is an environment in which one or more objects are moving; in contrast to a static scene where all objects are stationary. An example of a dynamic scene is a person's face which moves as the person talks. Another example of a dynamic scene is a motor vehicle driving along a road past trees. Another example of a dynamic scene is a standing person with moving arms.

In traditional computer graphics, computing synthetic images of dynamic scenes is a complex task since a rigged three dimensional (3D) model of the scene is needed. Obtaining such a rigged 3D model is complex and time consuming and involves manual work.

Synthetic images of dynamic scenes are used for a variety of purposes such as computer games, films, video communications and more.

The embodiments described below are not limited to implementations which solve any or all of the disadvantages of known apparatus for computing synthetic images of dynamic scenes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus with at least one processor; and a memory storing instructions that, when executed by the at least one processor (714), perform a method for computing an output image of a dynamic scene. The instructions comprise:
selecting: a value of E which is a parameter describing desired dynamic content of the scene in the output image, intrinsic camera parameter values of a virtual camera associated with the output image, a viewpoint for the virtual camera;
accessing a trained machine learning model which has been trained to produce colour and density values, given points in the dynamic 3D scene, a viewing direction and a value of E;
using the intrinsic camera parameters and the viewpoint, for individual pixels of the output image to be generated, compute a ray that goes from the virtual camera through the pixel into the dynamic scene;
for individual ones of the rays, sample at least one point along the ray;
for individual ones of the sampled points, a viewing direction being a direction of the corresponding ray, and E, query the machine learning model to produce colour and opacity values at the sampled point with the dynamic content of the scene as specified by E;
for individual ones of the rays, apply a volume rendering method to the colour and opacity values computed along that ray, to produce a pixel value of the output image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples The technology described herein uses neural radiance field technology and volume rendering technology. Neural radiance field technology is machine learning technology where a neural network or other machine learning model is used to represent a radiance field which is a 3D space (referred to as a field) where values of radiance are known at points in the field. A radiance value is made up of a color value and an opacity value. Volume rendering technology is able to compute an image from a radiance field for a particular camera viewpoint by examining radiance values of points along rays which form the image.

Figure 1:
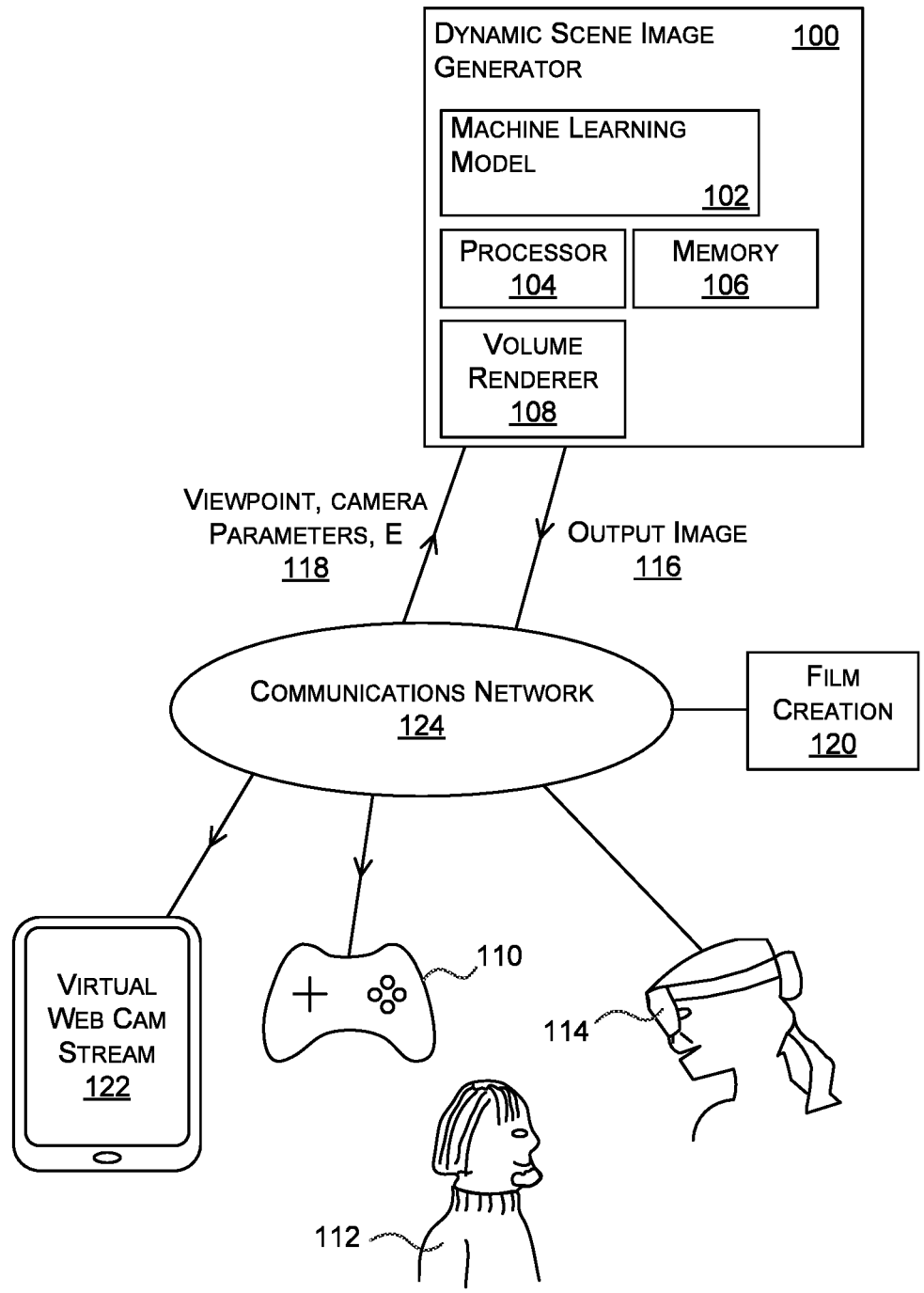
FIG. 1 is a schematic diagram of a dynamic scene image generator deployed as a web service.

FIG. 1 is a schematic diagram of a dynamic scene image generator 100 deployed as a web service. The dynamic scene image generator 100 is functionality at one or more web servers and includes a machine learning model 102, at least one processor 104, a memory 106 and a volume renderer 108. The machine learning model 102 is a neural network, or a random decision forest, or a support vector machine or other type of machine learning model. It has been trained to predict pairs of colour and opacity values of three dimensional points in a dynamic scene and more detail about the training process is given later in this document. The volume renderer 108 is a well-known computer graphics volume renderer which takes pairs of colour and opacity values of three dimensional points along rays and computes an output image.

The dynamic scene image generator 100 web service is configured to receive queries from client devices such as smart phone 122, computer game apparatus 110, head worn computer 114, file creation apparatus 120 or other client device. The queries are sent from the client devices over a communications network 104 to the dynamic scene image generator 100.

A query from a client device comprises a specified viewpoint of a virtual camera, specified values of intrinsic parameters of the virtual camera and a value of E. A synthetic image is to be computed by the dynamic scene image generator 100 as if it had been captured by the virtual camera. E is a parameter describing desired dynamic content of the scene in the output image.

The dynamic scene image generator 100 receives a query and in response generates a synthetic output image which it sends as output image 116 to the client device. The client device uses the output image 116 for one of a variety of useful purposes including but not limited to: generating a virtual webcam stream, generating video of a computer video game, generating a hologram for display by a mixed-reality head worn computing device, generating a film. The dynamic scene image generator 100 is able to compute synthetic images of a dynamic 3D scene, for particular specified desired dynamic content and particular specified viewpoints, on demand. In an example, the dynamic scene is a face of a talking person. The dynamic scene image generator 100 is able to compute synthetic images of the face from a plurality of viewpoints and with any specified dynamic content. Non-limiting examples of specified viewpoints and dynamic content are: plan view, eyes shut, face titled upwards, smile; perspective view, eyes open, mouth open, angry expression. Note that the dynamic scene image generator is able to compute synthetic images for viewpoints and values of parameter E which were not present in training data used to train the machine learning model since the machine learning model is able to generalize. Other examples of dynamic scenes are given with reference to FIG. 2 below. By using the parameter E it is possible to control the dynamic scene content depicted in the generated synthetic image. By selecting the viewpoint and the intrinsic camera parameter values it is possible to control characteristics of the synthetic output image.

The machine learning model operates in an unconventional manner to enable synthetic images of dynamic scenes to be generated in a controllable manner. Many alternative methods of using machine learning to generate synthetic images have little or no ability to control content depicted in the synthetic images which are generated.

The machine learning model improves the functioning of the underlying computing device by enabling synthetic images of dynamic scenes to be computed in a manner whereby the content and viewpoint of the dynamic scene is controllable.

Alternatively, or in addition, the functionality of the dynamic scene image generator 100 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In the example of FIG. 1 the dynamic scene image generator 100 is deployed as a web service. In other examples the functionality of the dynamic scene image generator 100 is located at a client device, or is shared between a client device and the cloud.

Figure 2:
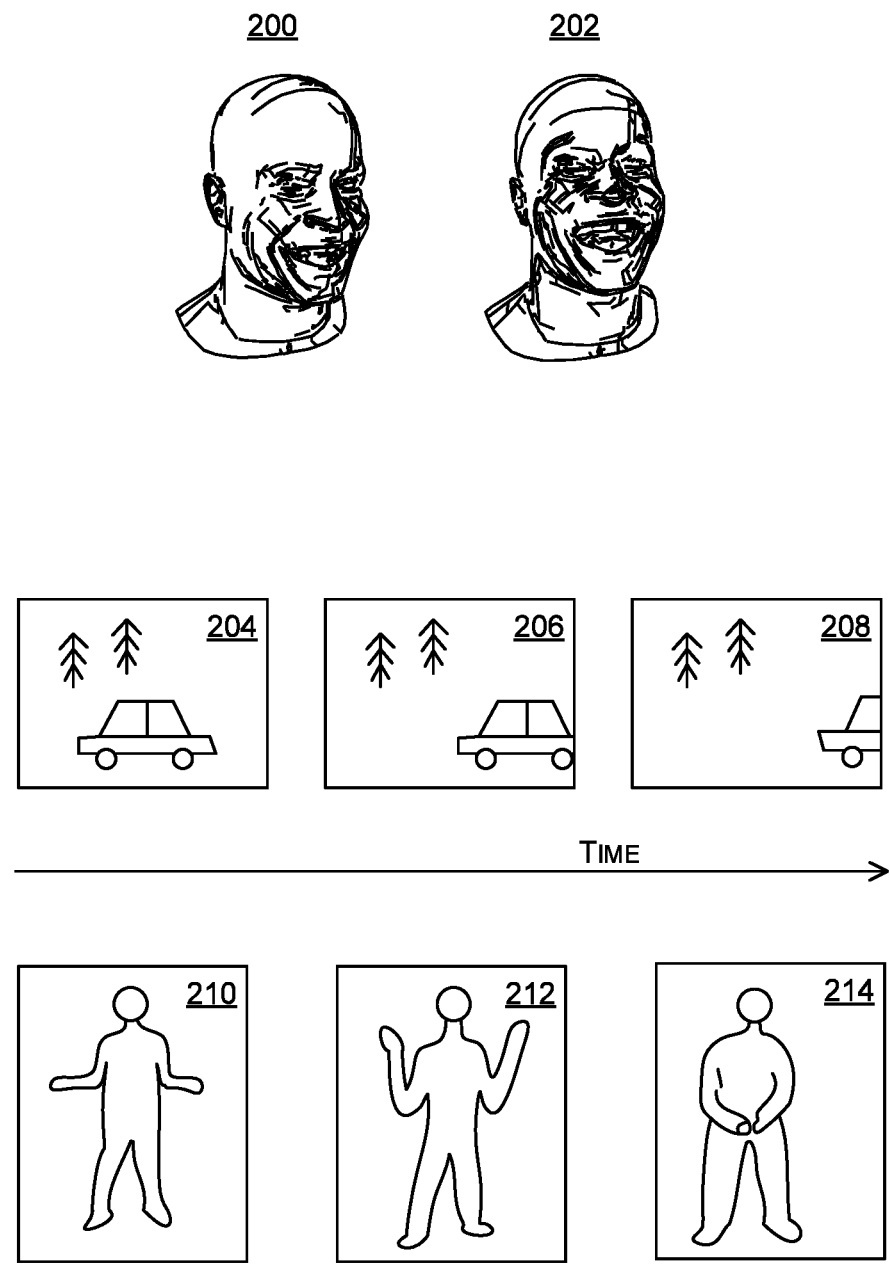
FIG. 2 is a schematic diagram of three dynamic scenes.

FIG. 2 is a schematic diagram of three different dynamic scenes which are non-limiting examples of dynamic scenes suitable for use with the present technology. In FIG. 2 time is represented as moving from left to right as indicated by the arrow. One dynamic scene, shown at the top of the page, is of a person's face changing expression and of the person's head changing orientation (referred to as pose). The face begins at 200 in a smiling expression looking straight ahead and then the head tilts up and back at 202 and the smiling expression continues. Where the machine learning system has been trained using images of the person's head and face for different known values of E during the dynamic scene 200, 202 and from a variety of viewpoints, the dynamic scene image generator is able to generate synthetic images of the dynamic scene from a plurality of viewpoints and with any specified dynamic scene content specified using E. In an example, the specified viewpoint is the same viewpoint as for 200 and the specified dynamic scene content is a neutral expression, then the generated synthetic image is the person's head and face with a neutral expression and in a perspective view as in FIG. 3, 300. In this example E is a concatenation of values of parameters of a 3D model of a head and face of a person. The parameters include but are not limited to: position, orientation, shape.

FIG. 2 also shows a dynamic scene of a motor vehicle driving past two trees. At image 204 the motor vehicle is in front of the trees, at image 206 the motor vehicle is to the right of the trees and at image 208 the motor vehicle is almost out of view. Where the machine learning system has been trained using images of the dynamic scene from a variety of viewpoints and at different known times during the dynamic scene, the dynamic scene image generator is able to generate synthetic images of the dynamic scene from a plurality of viewpoints and with any specified dynamic scene content. In an example, the specified viewpoint is a bird's eye view and the specified dynamic scene content (specified using parameter E) is specified as a time value before the time value of image 204. The dynamic scene image generator computes a synthetic image as at 302 which is a plan view of the two trees (the two circles) and the front of the motor vehicle (the rectangle) which is just coming into view.

Figure 3:
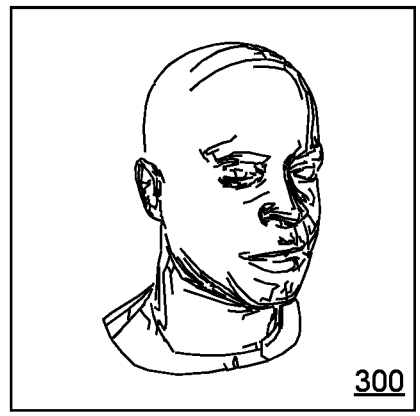
FIG. 3 is a schematic diagram of three output images computed by the dynamic scene image generator of FIG. 1.
Figure 3:
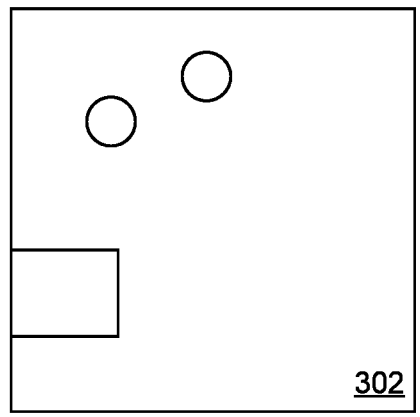
Figure 3:
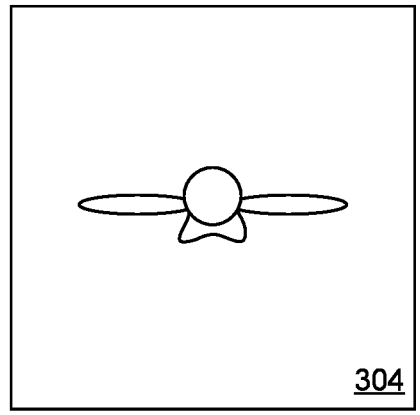

FIG. 3 also shows a dynamic scene of a standing person with moving arms. At image 210 the standing person has forearms extending substantially perpendicular to his or her body and with upper arms against the torso. At image 212 the standing person has forearms extending substantially vertically. At image 214 the standing person has hands clasped in front of the person and with arms lowered. Where the machine learning system has been trained using images of the dynamic scene from a variety of viewpoints and different known values of E during the dynamic scene, the dynamic scene image generator is able to generate synthetic images of the dynamic scene from a plurality of viewpoints and with any specified dynamic scene content. In an example, the specified viewpoint is a bird's eye view and the specified dynamic scene content is arms outstretched so that the body and arms form a T shape. The dynamic scene image generator computes a synthetic image as at 304 which is a plan view of the person showing the head, arms and tips of the feet. In this example, E is a vector of 3D joint positions of joints of a skeletal model of a person.

The examples in FIG. 3 illustrate the range of different types of dynamic scene which are usable with the present technology. The examples in FIG. 3 also illustrate how E is specified using one or more of: a time value, parameters of a 3D model of one or more objects in the dynamic scene.

Figure 4:
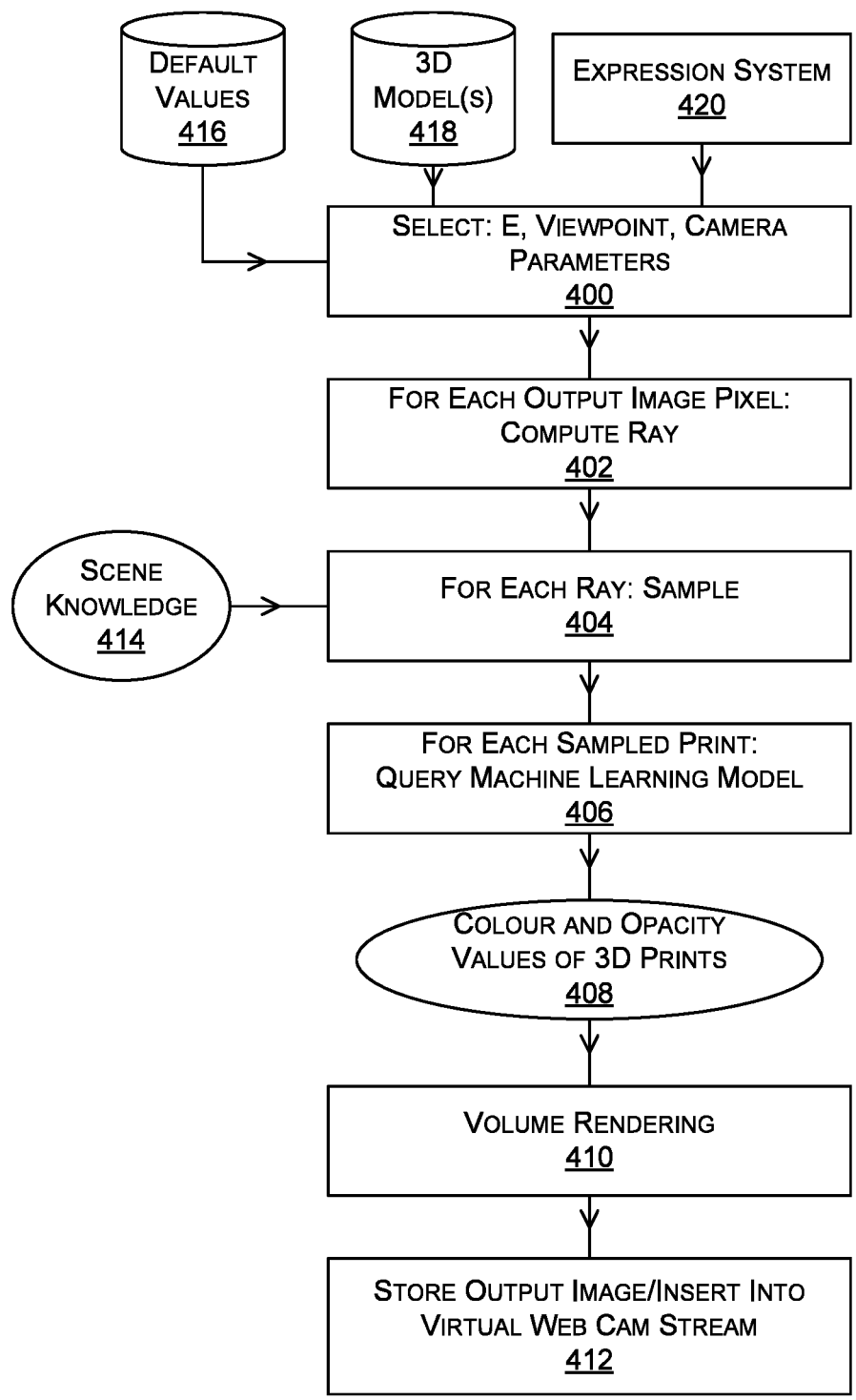
FIG. 4 is a flow diagram of a method carried out by the dynamic scene image generator of FIG. 1.

FIG. 4 is a schematic diagram of a method of operation at a dynamic scene image generator. Values of E as well as a viewpoint and intrinsic camera parameter values of a virtual camera are selected 400. The intrinsic camera parameters are lens and sensor parameters such as image resolution, field of view, focal length. The type and format of E depends on the type and format of E used in the training data when the machine learning system was trained. The training process is described later with respect to FIG. 6. FIG. 4 is concerned with test time operation after training has been completed. In some cases E is a time value. In some cases E is a vector of concatenated parameter values of a parameterized 3D model of an object in the dynamic scene. Other types and format of E are used in some cases.

The selection at operation 400 is done using default values 416 for some or all of E, the viewpoint, the intrinsic camera parameters. In some cases the selection at operation 400 is done by receiving input from a user or from a game apparatus or other process. In an example, the selection at operation 400 is made according to game state from a computer game or according to state received from a mixed-reality computing device. In an example an expression system 420 provides the values of E. The expression system is a trained machine learning model which takes as input captured sensor data depicting at least part of a person's face and predicts values of expression parameters of a 3D face model of the person. Expression parameters are shape parameters.

At operation 402 the dynamic scene image generator computes a plurality of rays, each ray associated with a pixel of an output image to be generated by the dynamic scene image generator. For a given pixel (x, y position in the output image) the dynamic scene image generator computes a ray that goes from the virtual camera through the pixel into the dynamic scene. To compute the ray the dynamic scene image generator uses geometry and the selected values of the intrinsic camera parameters as well as the camera viewpoint. The rays are computed in parallel where possible in order to give efficiencies since there is one ray to be computed per pixel.

For each ray the dynamic scene image generator samples at least one point along the ray. The sample is selected at random and within specified bounds obtained from scene knowledge 414. In an example the specified bounds are computed from training data which has been used to train the machine learning system. The bounds indicate a size of the dynamic scene so that the one or more samples are taken from regions of the rays which are in the dynamic scene. To compute the bounds from the training data standard image processing techniques are used to examine training images. It is also possible for the bounds of the dynamic scene to be manually specified by an operator or for the bounds to be measured automatically using a depth camera, GPS sensor or other position sensor.

For each sampled point the dynamic scene image generator queries 406 the machine learning model 102. The machine learning model has already been trained to produce colour and density values, given points in the dynamic 3D scene, a viewing direction (i.e. direction of the ray) and a value of E. In response to each query the trained machine learning model produces a pair of values comprising a colour and an opacity at the sampled point with the dynamic content of the scene as specified by E. In this way the machine learning model computes a plurality of colour and opacity values 408 of 3D points in the dynamic scene with the dynamic content of the scene as specified by E.

For each ray, a volume rendering 410 method is applied to the colour and opacity values computed along that ray, to produce a pixel value of the output image. Any well-known computer graphics method for volume ray tracing is used. Where real time operation is desired hardware-accelerated volume rendering is used.

The output image is stored 412 or inserted into a virtual webcam stream.

The fact that the machine learning model works well for dynamic scenes is surprising because the dynamic input E describes global changes to the scene, while the samples of operation 406 query very localized information. Hence, one would expect that the machine learning model will struggle to take E into account correctly for each possible position of the sampled point and its viewing direction. However, it has been found that the machine learning model does in fact work well for dynamic scenes.

Figure 5:
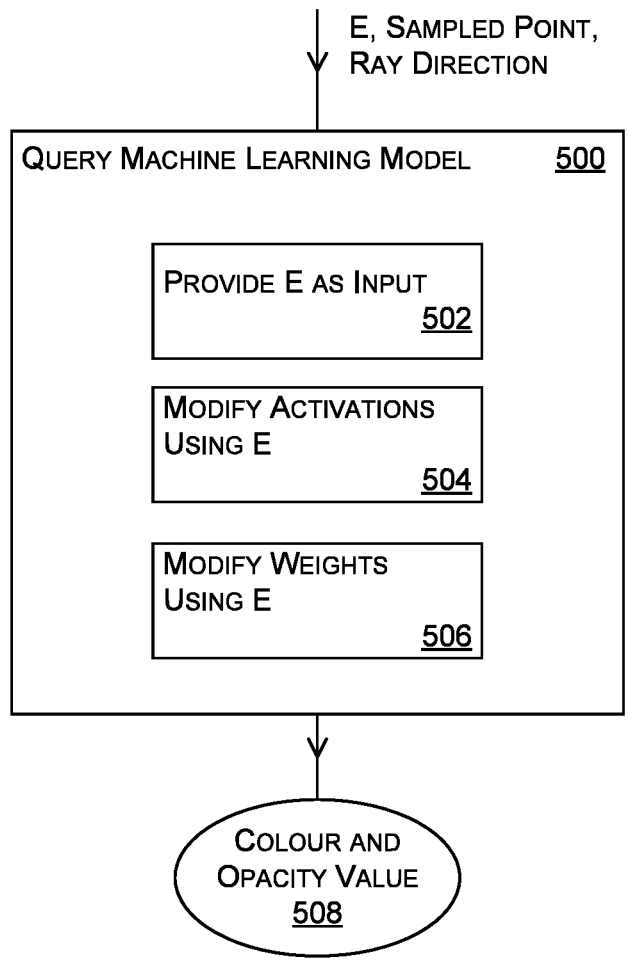
FIG. 5 is a diagram with more detail about operation 406 of FIG. 4.

FIG. 5 is a flow diagram of a method at operation 406 of FIG. 4 in more detail. The operation 406 comprises querying the machine learning model. A query comprises a value of E, a sampled point on a ray and a direction of the ray.

In a first example, the machine learning model is queried by providing E as an input 502 to the machine learning model together with the sampled point and the ray direction. In this case the machine learning model is a neural network or a random decision forest or a support vector machine or any other suitable type of machine learning model. Providing E as an input to the machine learning model is a simple and effective way to enable predictions computed by the machine learning model to take into account E. Using the method of the first example is found to give good working results in practice. The first example is extended in some cases by computing a positional encoding of the sampled point and computing the same positional encoding of E. The positional encoding maps its input to a higher-dimensional space using a high-frequency function. This allows the neural network to produce higher-frequency (i.e. sharper) outputs.

In a second example, the machine learning model is a neural network with a plurality of layers each layer comprising a plurality of nodes. The output of the nodes of a layer are referred to as activations. Generally speaking, the output of the nodes of a layer are sent as inputs to an immediately subsequent layer of the network. In the second example, at least some of the activations of a neural network are modified using E. The activations of at least some of the layers are modified 504 using a function that takes both the activation and E as input. In an example, activations of all the layers are modified but it is not essential to modify activations of all the layers. An example function is $$a = a + F(E),$$

where a is the activation and F is a multi-layer perceptron.

By modifying activations of one or more layers, the neural network itself is modified in contrast to the first example. In the first example, E is specified as input only to the first layer of the neural network. In contrast, in the second example a single value of E is passed to a plurality of layers of the neural network, through modification of their activations. This facilitates the use of information in E by later layers of the neural network.

In a third example, the machine learning model is a neural network with a plurality of layers each layer comprising a plurality of nodes where each node has a weight. In the third example at least some of the weights of the neural network are modified using E. A function that depends on E is used to modify at least some of the weights. The third example gives even more ability for the machine learning model to interpret different values of E than for the second and first examples. An example of a function that depends on E which is used is $$w = w + \text{MLP}(E),$$

where MLP denotes a multi-layer perceptron and w denotes a weight.

As a result of the query operation 500 the machine learning model computes 508 a colour and opacity value. The method of FIG. 5 repeats for each query made to the machine learning model.

In cases where the machine learning model is a neural network, the querying process 500 may comprise any one or more of the operations 502, 504, 506 of FIG. 5.

Figure 6:
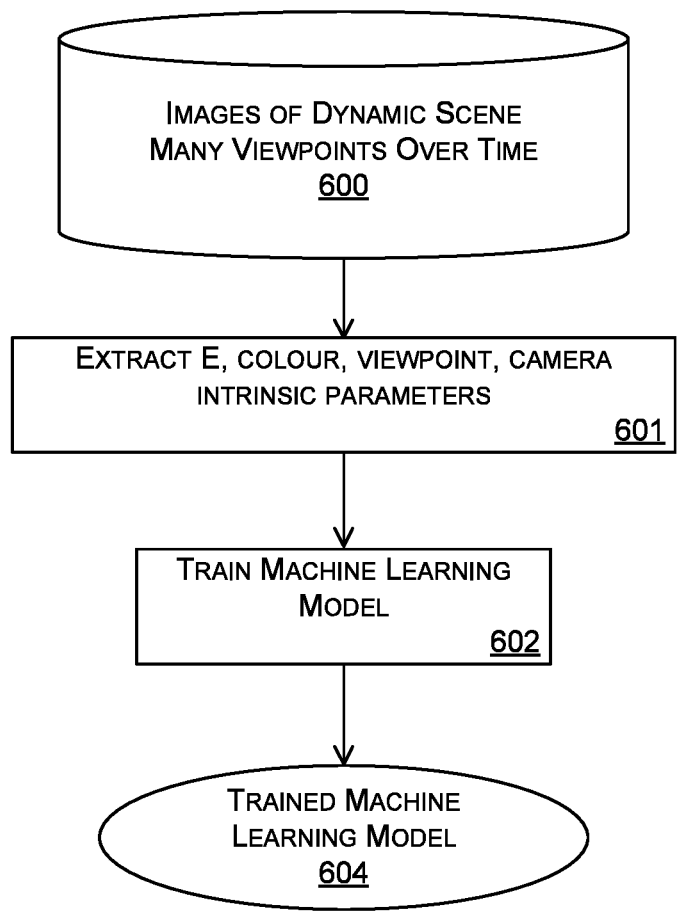
FIG. 6 is a flow diagram of a method of training a machine learning model for use in the dynamic scene image generator of FIG. 1.

FIG. 6 is a flow diagram of a method of training a machine learning model for use in a dynamic scene image generator 100. Training data 600 is accessed comprising images of a dynamic scene taken from many viewpoints over time. The training data images are real images such as photographs or video frames. It is also possible for the training data images to be synthetic images. From the training data images, tuples of values are extracted 601 where each tuple is a value of E, a camera viewpoint, camera intrinsic parameters and a colour of a given pixel.

In the example of the motor vehicle driving past trees from FIG. 2, the training data comprises images of the scene taken from many different known viewpoints over time. Each training image has a timestamp indicating when it was captured and has a 3D position and orientation of a camera used to capture the training image.

In the example of the face from FIG. 2, the training data comprises images of the person's face taken from many different known viewpoints over time. Associated with each training data image are values of parameters of a 3D model of the person's face and head. The parameters include pose (position and orientation) of the eyes, and bones of the neck and jaw, as well as expression parameters which specify characteristics of human facial expressions such as eyes shut/open, mouth shut/open, smile/no smile and others. The images are real images of a person captured using one or more cameras with known viewpoints. A 3D model is fitted to each image using any well-known model fitting process whereby values of parameters of the 3D model are searched to find a set of values which enable the 3D model to describe the observed real image. The values of the parameters which are found are then used to label the real image and are a value of E. Each real image is also labelled with a known camera viewpoint of a camera used to capture the image.

In the example of the standing person from FIG. 2, the training data comprises images of the standing person taken from many different known viewpoints over time. Associated with each training data image are joint positions of the person obtained from a depth camera, having known joint position detection technology, which is in the scene at training time. The images are real images of a person captured using one or more cameras with known viewpoints. The values of the joint positions are used as E in the training data.

The machine learning model is trained 602 using supervised training with a training objective that seeks to minimize the difference between colour produced by the machine learning model and colour given in the ground truth training data. The trained machine learning model 604 is stored and deployed at a web server or client device as described above with reference to FIG. 1.

In a non-limiting example, the machine learning model is an extension of a multi-layer perceptron as described in "NeRF: Representing Scenes as Neural Radiance Fields for View Synthesis" Mildenhall et al., arXiv 2003.08934v1 19 Mar. 2020. In this example the multi-layer perceptron has 8 fully connected layers using rectified linear unit (ReLU) activations and 256 channels per layer) and outputs the predicted opacity and a 256 dimensional feature vector. A concatenation of the feature vector and ray direction are input to 4 more fully connected layers of the multi-layer perceptron. These four fully connected layers also using ReLU activations and have 128 channels per layer. The output of the four fully connected layers is the predicted colour value. The machine learning model is encouraged to be multi-view consistent. That is achieved by enabling the machine learning model to predict opacity as a function of location of the sampled point on a ray while allowing colour to be predicted as a function of both location of the sample point and direction of the ray. Volume rendering is used to render the colour of rays passing through the scene. A positional encoding of the input 3D location and 2D viewing direction is used together with a hierarchical sampling procedure to enable efficient sampling of the positional encoding representation.

The multi-layer perceptron is given additional inputs comprising expression parameters of a face model. The training data consists of images of the face taken by tens of cameras in a camera rig over time. In this example it is found that the multi-layer perceptron achieves a Peak Signal to Noise Ratio (PSNR) of 33.5. In comparison, multi-layer perceptrons trained on static scenes showing faces captured using the same camera rig achieve PSNR values of 33-38. These empirical results demonstrate that the technology is workable for dynamic scenes of faces with similar levels of performance as for static scenes of faces. Therefore it is plausible and there are good theoretical reasons that the technology is workable over the whole scope of the claims and including for dynamic scenes of other types of object such as motor vehicles, people and other objects. As described in this document it is possible to use different neural network architectures and different types of machine learning model and achieve good working results.

Figure 7:
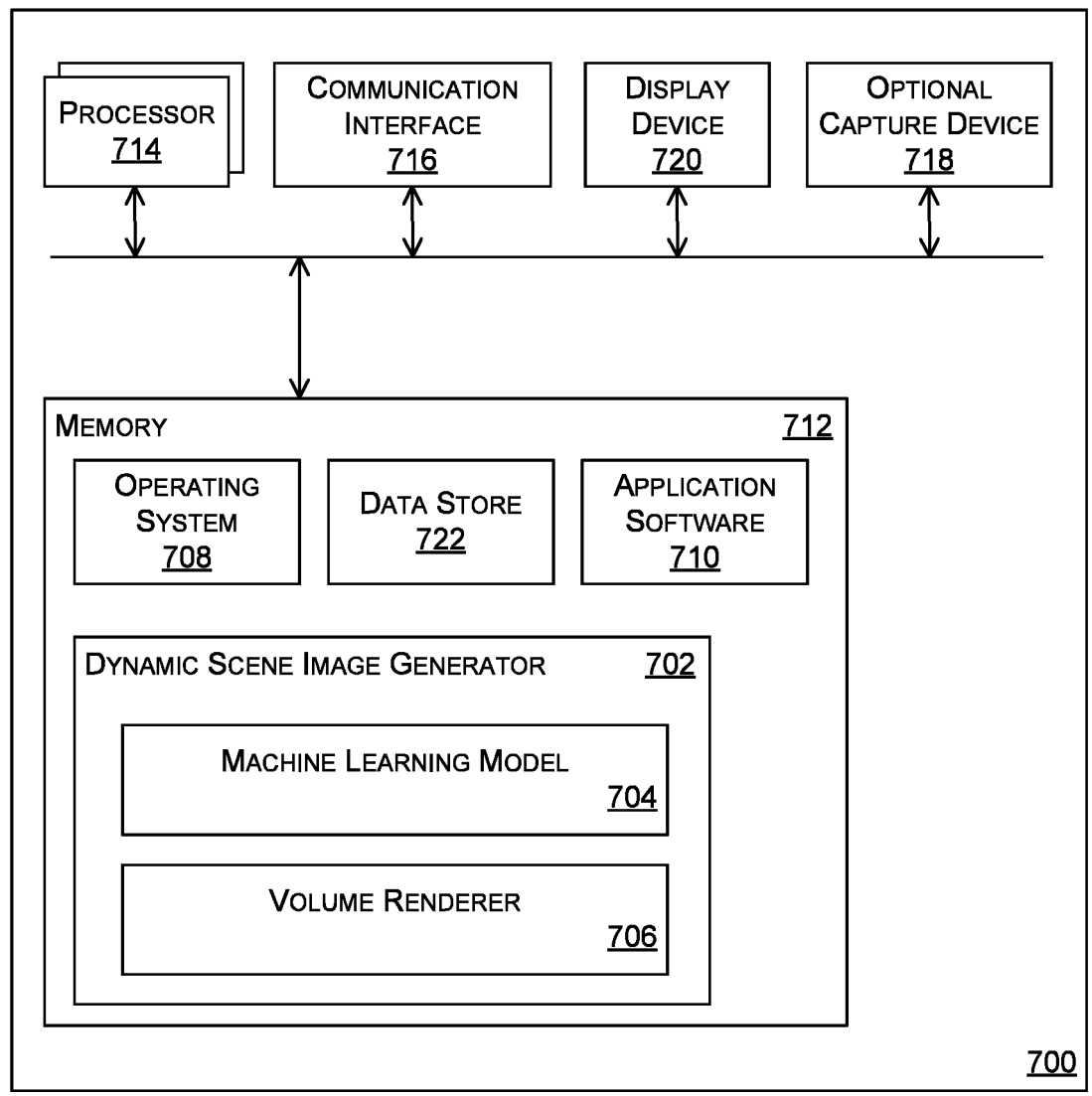
FIG. 7 illustrates an exemplary computing-based device in which embodiments of a dynamic scene image generator are implemented.

FIG. 7 illustrates various components of an exemplary computing-based device 700 which are implemented as any form of a computing and/or electronic device, and in which embodiments of a dynamic scene image generator are implemented in some examples.

Computing-based device 700 comprises one or more processors 714 which are microprocessors, controllers or any other suitable type of processors for processing computer executable instructions to control the operation of the device in order to generate synthetic images of a dynamic scene in a controllable manner. In some examples, for example where a system on a chip architecture is used, the processors 714 include one or more fixed function blocks (also referred to as accelerators) which implement a part of the method of any of FIGS. 4 to 6 in hardware (rather than software or firmware). Platform software comprising an operating system 708 or any other suitable platform software is provided at the computing-based device to enable application software 710 to be executed on the device. A data store 722 holds output images, values of E, intrinsic camera parameter values, viewpoints and other data. A dynamic scene image generator 702 comprising a machine learning model 704 and a volume renderer 706 is present at the computing-based device 700.

The computer executable instructions are provided using any computer-readable media that is accessible by computing based device 700. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 712) is shown within the computing-based device 700 it will be appreciated that the storage is, in some examples, distributed or located remotely and accessed via a network or other communication link (e.g. using communication interface 716).

The computing-based device 700 has an optional capture device 718 to enable the device to capture sensor data such as images and videos. The computing-based device 700 has an optional display device 720 to display output images and/or values of parameters.

Alternatively or in addition to the other examples described herein, examples include any combination of the following clauses:

Clause A. An apparatus comprising:
at least one processor;
a memory storing instructions that, when executed by the at least one processor (714), perform a method for computing an output image of a dynamic scene comprising:
selecting: a value of E which is a parameter describing desired dynamic content of the scene in the output image, intrinsic camera parameter values of a virtual camera associated with the output image, a viewpoint for the virtual camera;
accessing a trained machine learning model which has been trained to produce colour and density values, given points in the dynamic 3D scene, a viewing direction and a value of E;
using the intrinsic camera parameters and the viewpoint, for individual pixels of the output image to be generated, compute a ray that goes from the virtual camera through the pixel into the dynamic scene;
for individual ones of the rays, sample at least one point along the ray;
for individual ones of the sampled points, a viewing direction being a direction of the corresponding ray, and E, query the machine learning model to produce colour and opacity values at the sampled point with the dynamic content of the scene as specified by E;
for individual ones of the rays, apply a volume rendering method to the colour and opacity values computed along that ray, to produce a pixel value of the output image. In this way the output image is computed so that it depicts content of the dynamic scene in a controllable manner. That is, content of the dynamic scene which is depicted is controlled and a viewpoint of the dynamic scene is also controllable. Since a machine learning model is used to compute the output image improved realism is obtained as compared with using traditional computer graphics techniques that do not involve machine learning models. The synthetic output images are obtained in an efficient manner without the need for manual rigging of a scene.

Clause B. The apparatus of clause A wherein the instructions comprise one or more of: storing the output image, transmitting the output image to a computer game application, transmitting the output image to a telepresence application, inserting the output image into a virtual webcam stream. Useful purposes of the output image are numerous.

Clause C. The apparatus of any preceding clause wherein the machine learning model has been trained using a plurality of images of the dynamic scene from a plurality of different viewpoints over a period of time. By training a machine learning model in this way powerful applications are possible for generating synthetic images.

Clause D. The apparatus of any preceding clause wherein the parameter E is a time signal. Where the parameter E is a time signal a user or other process is able to control content of synthetic images generated of the scene according to time values. In a non-limiting example, a process is able to generate an image of a scene of a motor vehicle driving past trees at a given point in time and from a given viewpoint.

Clause E. The apparatus of any preceding clause wherein the parameter E comprises values of parameters of a 3D model of an object in the dynamic scene at a specified time. Using parameters of a 3D model of an object enables high level control of content of synthetic images generated by the apparatus.

Clause F. The apparatus of clause E wherein the parameters of the 3D model comprise position, orientation and shape parameters.

Clause G. The apparatus of clause E wherein the object is a face and the parameter E comprises values of expression parameters of a 3D model of the face in the dynamic scene at the specified time. Being able to control expression of a face depicted in a synthetic image of a dynamic scene such as a scene of a talking person is extremely useful for applications such as telepresence.

Clause H. The apparatus of clause E wherein the object is a person and the parameter E comprises values of joint position parameters of a model of the person in the dynamic scene at the specified time. In this way a process is able to control joint position of a person depicted in the generated output image.

Clause I. The apparatus of any preceding clause wherein querying the machine learning model comprises inputting the selected value of E to the machine learning model together with the associated sampled point. This is an efficient way of querying.

Clause J. The apparatus of any preceding clause wherein querying the machine learning model comprises inputting the selected value of E to the machine learning model after encoding the selected value of E using a positional encoding. There is no need for the positional encoding to be the same as a positional encoding used for the associated sampled point.

Clause K. The apparatus of any preceding clause wherein the machine learning model is a neural network and wherein querying the machine learning model comprises using the selected value of E to modify one or more activations of the neural network. By modifying activations of the neural network it is possible to enable the neural network to interpret more variety of values of E and obtain more accurate results than for the case in clause J.

Clause L. The apparatus of any preceding clause wherein the machine learning model is a neural network and wherein querying the machine learning model comprises using the selected value of E to modify one or more weights of the neural network. By modifying weights of the neural network it is possible to enable the neural network to interpret more variety of values of E and obtain more accurate results than for the case in clause K.

Clause M. The apparatus of any preceding clause wherein the machine learning model is a neural network and wherein querying the machine learning model comprises one or more of: inputting the selected value of E to the machine learning model together with the associated sampled point, using the selected value of E to modify one or more activations of the neural network, using the selected value of E to modify one or more weights of the neural network. Using hybrid approaches gives robustness and improved performance.

Clause N. The apparatus of any preceding clause wherein sampling at least one point along the ray comprises taking into account bounds of the scene. In this way efficiencies are gained enabling saving power and computing resources.

Clause O. The apparatus of any preceding clause integral with a head mounted display. Integrating with a head mounted display enables the technology to be used in conjunction with mixed reality telepresence applications.

Clause P. The apparatus of any preceding clause wherein the instructions comprise training the machine learning model using training data comprising images of the dynamic scene from a plurality of viewpoints at a plurality of different times.

Clause Q. A computer-implemented method for computing an output image of a dynamic scene comprising:
selecting: a value of E which is a parameter describing desired dynamic content of the scene in the output image, intrinsic camera parameter values of a virtual camera associated with the output image, a viewpoint for the virtual camera;
accessing a trained machine learning model which has been trained to produce colour and density values, given points in the dynamic 3D scene, a viewing direction and a value of E;
using the intrinsic camera parameters and the viewpoint, for individual pixels of the output image to be generated, compute a ray that goes from the virtual camera through the pixel into the dynamic scene;
for individual ones of the rays, sample at least one point along the ray;
for individual ones of the sampled points, a viewing direction being a direction of the corresponding ray, and E, query the machine learning model to produce colour and opacity values at the sampled point with the dynamic content of the scene as specified by E;
for individual ones of the rays, apply a volume rendering method to the colour and opacity values computed along that ray, to produce a pixel value of the output image.

Clause R. The computer-implemented method of clause Q comprising selecting the value of E according to one or more of: user input, captured sensor data, computer game state.

Clause S. The computer-implemented method of clause Q or clause R wherein querying the machine learning model comprises one or more of: inputting the selected value of E to the machine learning model together with the associated sampled point, using the selected value of E to modify one or more activations of the neural network, using the selected value of E to modify one or more weights of the neural network.

Clause T. A computer-implemented method of training a machine learning model the method comprising:
accessing a plurality of training images of a dynamic scene, the training images having been captured from a plurality of different viewpoints and at a plurality of different times;
for individual ones of the training images, specifying a viewing direction according to a known viewpoint of a capture device which captured the image;
for individual ones of the training images, specifying a value of E using one or more of: a time when the image was captured, a value of parameters of a 3D model of an object in the scene at the time when the image was captured;
for individual ones of the training images, extracting colour of points in the dynamic 3D scene;
training the machine learning model using supervised learning given the training images such that the machine learning model produces colour and density values, given points in the dynamic 3D scene, a viewing direction and a value of E.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An apparatus comprising:
   a processor;
   a memory storing instructions that, when executed by the processor, perform a method for computing an output image of a dynamic scene comprising:
   selecting a value of E which is a parameter describing desired dynamic content of the scene in the output image, intrinsic camera parameter values of a virtual camera associated with the output image, and a viewpoint for the virtual camera;
   accessing a machine learning model which has been trained to produce colour and opacity values, given points in the dynamic scene, a viewing direction and a value of E;
   utilizing the intrinsic camera parameter values and the viewpoint, for individual pixels of the output image to be generated, computing a ray that goes from the virtual camera through the pixel into the dynamic scene;
   for individual ones of the rays, sampling at least one point along the ray, the viewing direction being a direction of a corresponding ray;
   based on the value of E, individual ones of the sampled points, and the direction of the corresponding ray, querying the machine learning model to produce colour and opacity values at the sampled point with the dynamic content of the scene as specified by E; and
   for individual ones of the rays, applying a volume rendering method to the colour and opacity values computed along that ray, to produce a pixel value of the output image.

2. The apparatus of claim 1 wherein the instructions comprise one or more of: storing the output image, transmitting the output image to a computer game application, transmitting the output image to a telepresence application, inserting the output image into a virtual webcam stream.

3. The apparatus of claim 1 wherein the machine learning model has been trained using a plurality of images of the dynamic scene from a plurality of different viewpoints over a period of time.

4. The apparatus of claim 1 wherein the parameter E is a time signal.

5. The apparatus of claim 1 wherein the parameter E comprises values of parameters of a 3D model of an object in the dynamic scene at a specified time.

6. The apparatus of claim 5 wherein the parameters of the 3D model comprise position, orientation and shape parameters.

7. The apparatus of claim 5 wherein the object is a face and the parameter E comprises values of expression parameters of a 3D model of the face in the dynamic scene at the specified time.

8. The apparatus of claim 5 wherein the object is a person and the parameter E comprises values of joint position and joint orientation parameters of a 3D model of the person in the dynamic scene at the specified time.

9. The apparatus of claim 1 wherein querying the machine learning model comprises inputting the selected value of E to the machine learning model together with the associated sampled point.

10. The apparatus of claim 1 wherein querying the machine learning model comprises inputting the selected value of E to the machine learning model after encoding the selected value of E using a positional encoding.

11. The apparatus of claim 1 wherein the machine learning model is a neural network and wherein querying the machine learning model comprises using the selected value of E to modify one or more activations of the neural network.

12. The apparatus of claim 1 wherein the machine learning model is a neural network and wherein querying the machine learning model comprises using the selected value of E to modify one or more weights of the neural network.

13. The apparatus of claim 1 wherein the machine learning model is a neural network and wherein querying the machine learning model comprises one or more of: inputting the selected value of E to the machine learning model together with the associated sampled point, using the selected value of E to modify one or more activations of the neural network, using the selected value of E to modify one or more weights of the neural network.

14. The apparatus of claim 1 wherein sampling at least one point along the ray comprises taking into account bounds of the scene.

15. The apparatus of claim 1 wherein the apparatus is integral with a head mounted display.

16. The apparatus of claim 1 wherein the instructions comprise training the machine learning model using training data comprising images of the dynamic scene from a plurality of viewpoints at a plurality of different times.

17. A computer-implemented method for computing an output image of a dynamic scene comprising:

selecting a value of E which is a parameter describing desired dynamic content of the scene in the output image, intrinsic camera parameter values of a virtual camera associated with the output image, and a viewpoint for the virtual camera;

accessing a machine learning model which has been trained to produce colour and opacity values, given points in the dynamic scene, a viewing direction and a value of E;

utilizing the intrinsic camera parameter values and the viewpoint, for individual pixels of the output image to be generated, computing a ray that goes from the virtual camera through the pixel into the dynamic scene;

for individual ones of the rays, sampling at least one point along the ray, the viewing direction being a direction of a corresponding ray;

based on the value of E, individual ones of the sampled points, and the direction of the corresponding ray, querying the machine learning model to produce colour and opacity values at the sampled point with the dynamic content of the scene as specified by E; and for individual ones of the rays, applying a volume rendering method to the colour and opacity values computed along that ray, to produce a pixel value of the output image.

18. The computer-implemented method of claim 17 comprising selecting the value of E according to one or more of: user input, captured sensor data, computer game state.

19. The computer-implemented method of claim 17 wherein querying the machine learning model comprises one or more of: inputting the selected value of E to the machine learning model together with the associated sampled point, using the selected value of E to modify one or more activations of a neural network, using the selected value of E to modify one or more weights of the neural network.

20. A computer storage medium storing computer executable instructions that upon execution by a processor perform a method for computing an output image of a dynamic scene comprising:

selecting a value of E which is a parameter describing desired dynamic content of the scene in the output image, intrinsic camera parameter values of a virtual camera associated with the output image, and a viewpoint for the virtual camera;

accessing a machine learning model which has been trained to produce colour and opacity values, given points in the dynamic scene, a viewing direction and a value of E;

utilizing the intrinsic camera parameter values and the viewpoint, for individual pixels of the output image to be generated, computing a ray that goes from the virtual camera through the pixel into the dynamic scene;

for individual ones of the rays, sampling at least one point along the ray, the viewing direction being a direction of a corresponding ray;

based on the value of E, individual ones of the sampled points, and the direction of the corresponding ray, querying the machine learning model to produce colour and opacity values at the sampled point with the dynamic content of the scene as specified by E; and for individual ones of the rays, applying a volume rendering method to the colour and opacity values computed along that ray, to produce a pixel value of the output image.

* * * * *